US010649417B2

(12) United States Patent
Bandaru et al.

(10) Patent No.: US 10,649,417 B2
(45) Date of Patent: May 12, 2020

(54) CONTROLLING TENANT SERVICES BASED ON TENANT USAGE PERFORMANCE INDICATORS

(71) Applicant: Microsoft Technology Licensing, LLC, Redmond, WA (US)

(72) Inventors: Ravikumar Venkata Seetharama Bandaru, Harrow (GB); Michael Karl-Frans Berg, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 397 days.

(21) Appl. No.: 15/609,262

(22) Filed: May 31, 2017

(65) Prior Publication Data

US 2018/0348715 A1   Dec. 6, 2018

(51) Int. Cl.
  G05B 13/04   (2006.01)
  G05B 13/02   (2006.01)
  G06F 9/50   (2006.01)

(52) U.S. Cl.
  CPC ....... *G05B 13/042* (2013.01); *G05B 13/0265* (2013.01); *G06F 9/5072* (2013.01); *G06F 9/5083* (2013.01); *G06F 2209/5019* (2013.01)

(58) Field of Classification Search
  CPC .. G05B 19/19; G05B 19/401; G05B 19/4093; G05B 2219/37576; G05B 2219/50057; G05B 2219/45157; G05B 2219/35151; G05B 2219/35261
  USPC .................................................. 700/44, 291
  See application file for complete search history.

(56) References Cited

U.S. PATENT DOCUMENTS

| 9,495,211 | B1 | 11/2016 | Helstroom et al. |
| 9,703,664 | B1 * | 7/2017 | Alshawabkeh ..... G06F 11/3414 |
| 2008/0059972 | A1 | 3/2008 | Ding et al. |
| 2009/0276771 | A1 * | 11/2009 | Nickolov .............. G06F 9/4856 717/177 |
| 2012/0253930 | A1 | 10/2012 | Gao et al. |
| 2013/0311323 | A1 | 11/2013 | Stoll et al. |
| 2015/0178811 | A1 | 6/2015 | Chen |
| 2016/0205039 | A1 | 7/2016 | Akolkar et al. |
| 2017/0109205 | A1 * | 4/2017 | Ahuja .................... G06F 9/505 |

(Continued)

FOREIGN PATENT DOCUMENTS

| EP | 2615803 A2 | 7/2013 |
| WO | WO-2012018431 A1 * | 2/2012 .............. H04W 4/18 |

OTHER PUBLICATIONS

"International Search Report and Written Opinion Issued in PCT Application No. PCT/US2018/030334", dated Aug. 1, 2018, 13 Pages.

(Continued)

*Primary Examiner* — Darrin D Dunn
*Assistant Examiner* — Marzia T Monty
(74) *Attorney, Agent, or Firm* — Christopher J. Volkmann; Kelly, Holt & Christenson, PLLC

(57) ABSTRACT

A control system controls tenant services to various tenants by obtaining tenant attributes for each tenant, with respect to a particular workload. A model is generated that models tenant usage performance for a set of best performing tenants. The model is then applied to a remainder of the tenants to obtain a metric indicative of a likely tenant capacity for incremental usage of the workload. The control system controls the services provided to the tenant based upon the likelihood of adoption metric.

20 Claims, 10 Drawing Sheets

(56) References Cited

U.S. PATENT DOCUMENTS

2017/0244784 A1* 8/2017 Lam .................... H04L 67/1008
2018/0159727 A1* 6/2018 Liu ...................... H04L 41/145

OTHER PUBLICATIONS

Madhavan, Archana. "You're Measuring Daily Active Users Wrong", https://amplitude.com/blog/2016/01/14/measuring-active-users/, Published on: Jan. 14, 2016, 12 pages.

Niazi, Uruba, "Growth Marketing", https://getblueshift.com/category/growth-marketing/, Published on: Mar. 15, 2017, 24 pages.

Wu, et al., "Product Adoption Rate Prediction: A Multi-factor View", In Proceedings of the SIAM International Conference on Data Mining, Jun. 2015, pp. 154-162.

Mau, et al., "Anticipating insurance customers' next likely purchase events", In Proceedings of Second International conference for marketing in the insurance industry, Jun. 2016, pp. 1-9.

* cited by examiner

CONTROLLING TENANT SERVICES BASED ON TENANT USAGE PERFORMANCE INDICATORS

BACKGROUND

Computing systems are currently in wide use. Some computing systems include service computing systems that host services. Such services can include, for instance, electronic mail services, calendar services, and services that provide productivity applications, such as work processing applications, spreadsheet applications, presentation applications, among others. Such computing systems can also include document sharing and management systems, on-line storage systems, enterprise resource management and customer relationship management applications, among a wide variety of others.

Each of these different types of services or applications are sometimes referred to as a workload. For instance, an electronic mail application may be referred to as a first workload, while a document sharing and management system may be referred to as a second workload.

Some such computing systems also host workloads for tenants, which can be organizations that each have a plurality of users. When hosting workloads for different tenants, it can be difficult to know which types of services should be provided to which types of tenants in order to enhance their usage of the hosted workloads. It can also be difficult to control those services so that they are provided to the appropriate tenants, at the appropriate times.

In some current computing systems, for instance, it can be difficult to assign a priority to different services, and corresponding tenants. This is because it can be difficult to identify whether a particular tenant wishes to obtain a workload, wishes to adopt a new workload or a new feature, or wishes to grow the tenancy of a workload or feature that the tenant already subscribes to. Some prior systems have attempted to obtain this information by conducting manual surveys with a particular tenant. However, this is often infeasible due to its cost and its questionable accuracy. This information can also quickly become stale. Similarly, even if it is accurate, this type of information simply conveys the current status of a tenant but does not give an indication as to the tenant's potential to use workloads or features, etc.

The discussion above is merely provided for general background information and is not intended to be used as an aid in determining the scope of the claimed subject matter.

SUMMARY

A control system controls tenant services to various tenants by obtaining tenant attributes for each tenant, with respect to a particular workload. A model is generated that models tenant usage performance for a set of best performing tenants. The model is then applied to a remainder of the tenants to obtain a metric indicative of a likely tenant capacity for incremental usage of the workload. The control system controls the services provided to the tenant based upon the likelihood of adoption metric.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
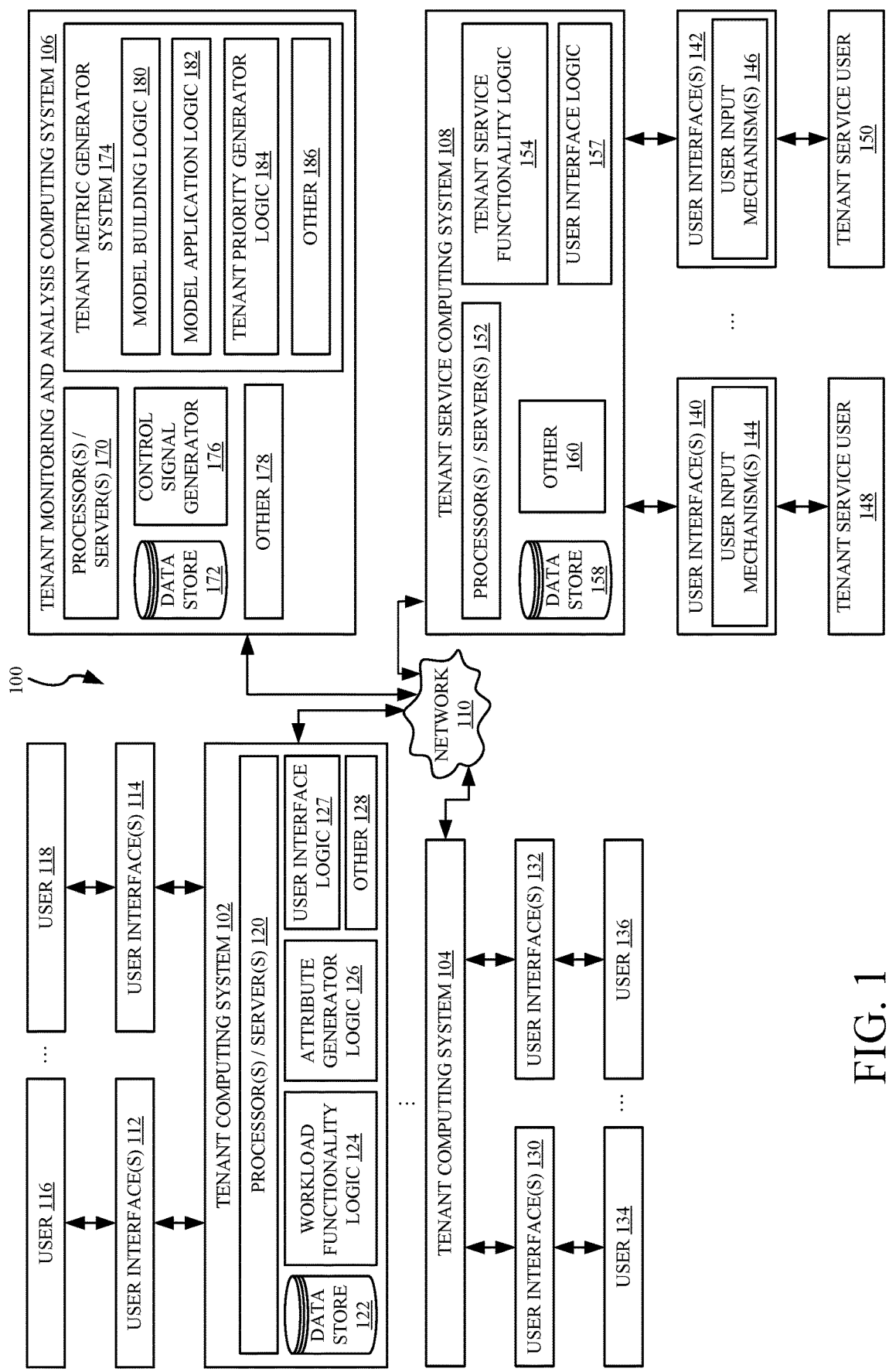
FIG. 1 is a block diagram of one example of a computing system architecture.

FIG. 1 is a block diagram of one example of a computing system architecture 100. Architecture 100 illustratively includes tenant computing systems 102-104 which can be connected to tenant monitoring and analysis computing system 106 as well to tenant service computing system 108 over network 110. Network 110 can be any of a wide variety of different types of networks, such as wide area network, a local area network, a cellular communication network, a near field communication network, or any other of a wide variety of networks or combinations of networks. Before describing architecture 100 in more detail, a brief description of some of the items in architecture 100, and their operation, will first be provided.

In the example shown in FIG. 1, tenant computing system 102 is shown generating user interfaces 112-114, which may have user input mechanisms, for interaction by users 116-118. Users 116-118 interact with the user input mechanisms on user interfaces 112-114 in order to control and manipulate tenant computing system 102, and possibly some components of tenant service computing system 108. Users 116-118 can interact directly with system 102 or through a network, such as network 110.

In the example shown in FIG. 1, tenant computing system 102 can include one or more processors or servers 120, data store 122, workload functionality 124, attribute generator logic 126, and it can include a wide variety of other items 128. Workload functionality 124 illustratively hosts one or more workloads (such as applications) that can be used to operate on, and interact with, data stored in data store 122. Users 116-118 can interact with user interfaces 112-114 in order to perform workload functionality using workload functionality logic 124. For example, where the workload is an electronic mail application, users 116-118 can interact with user interfaces 112-114 in order to perform e-mail functionality, such as send and receive e-mail messages, configure folders and filters, etc.

FIG. 1 also shows that, in one example, tenant computing system 104 generates user interfaces 130-132 (which may also have user input mechanisms) for interaction by users 134-136. Users 134-136 illustratively interact (either directly or over a network) with the user input mechanisms on user interfaces 130-132 in order to control and manipulate computing system 104, and perhaps some items of tenant service computing system 108. In the example illustrated, tenant computing system 104 can be similar to tenant computing system 102, and therefore it can host one or more applications for the users 134-136. In the example shown in FIG. 1, it is assumed that tenant computing system 104 is similar to tenant computing system 102, and therefore only tenant computing system 102 is described in more detail. This is done by way of example only.

Tenant service computing system 108 is shown generating user interfaces 140-142, with user input mechanisms 144-146, respectively, for interaction (either directly or over a network) by users 148-150. In one example, users 148-150 interact with user input mechanisms 144-146 in order to control and manipulate tenant service computing system 108. Tenant service computing system 108 can be used to perform services for tenants 102-104. Thus, tenant service computing system 108 can include one or more processors or servers 152, tenant service functionality logic 154, users interface logic 156, data store 158, and it can include a wide variety of other items 160. In one example, tenant service users 148-150 interact through mechanisms 144-146 with tenant service functionality logic 154 in order to perform services for the various tenants using tenant computing systems 102-104. The services can include services which are used in order to increase tenant satisfaction with a particular hosted workload or feature, to increase tenant usage performance. Increasing usage performance can include such things as increasing tenant adoption of a particular hosted workload or feature, increasing tenant engagement with a hosted workload or feature, or to otherwise enhance the experience of a particular tenant with respect to one or more hosted workloads or features. Tenant service users 148-150 may thus use computing system 108 to interact with tenants or users of tenants through tenant computing systems 102-104.

Tenant monitoring and analysis computing system 106, in the example shown in FIG. 1, illustratively includes one or more processors or servers 170, data store 172, tenant metric generator system 174, control signal generator 176, and it can include a wide variety of other items 178. Tenant metric generator system 174 can include model building logic 180, model application logic 182, tenant priority generator logic 184, and it can include a wide variety of other items 186. Tenant monitoring and analysis computing system 106 generates a metric indicative of a likelihood that a particular tenant will adopt or increase its engagement or usage of a particular workload or feature. It also illustratively generates a metric indicative of what that means, in terms of raw capacity (e.g., the number of users or seats) for that particular tenant. It can generate these metrics across different workloads, for different tenants, and it can aggregate the metrics for different workloads, and for each tenant, in order to obtain one or more overall metrics corresponding to each tenant, indicative of an incremental capacity that the tenant has for the one or more workloads, and a likelihood that the tenant will reach that capacity. Control signal generator 176 illustratively generates one or more control signals that are provided to tenant service computing system 108, based upon the metrics. The control signals can be used to identify and control various services that may be conducted for the various tenants.

In generating the metrics for each tenant, model building logic 180 illustratively receives tenant attributes for a variety of different tenants. Model building logic 180 then builds and trains a model that models the performance of a subset of those tenants (such as the best performing tenants in terms of workload or feature usage). Model application logic 182 then applies that model to the remaining tenants in order to identify the metrics indicative of how likely those tenants are to adopt or increase usage of a particular workload or feature, and tenant priority generator logic 184 illustratively generates a rank order of tenants based on the metrics generated for each tenant.

Figure 2:
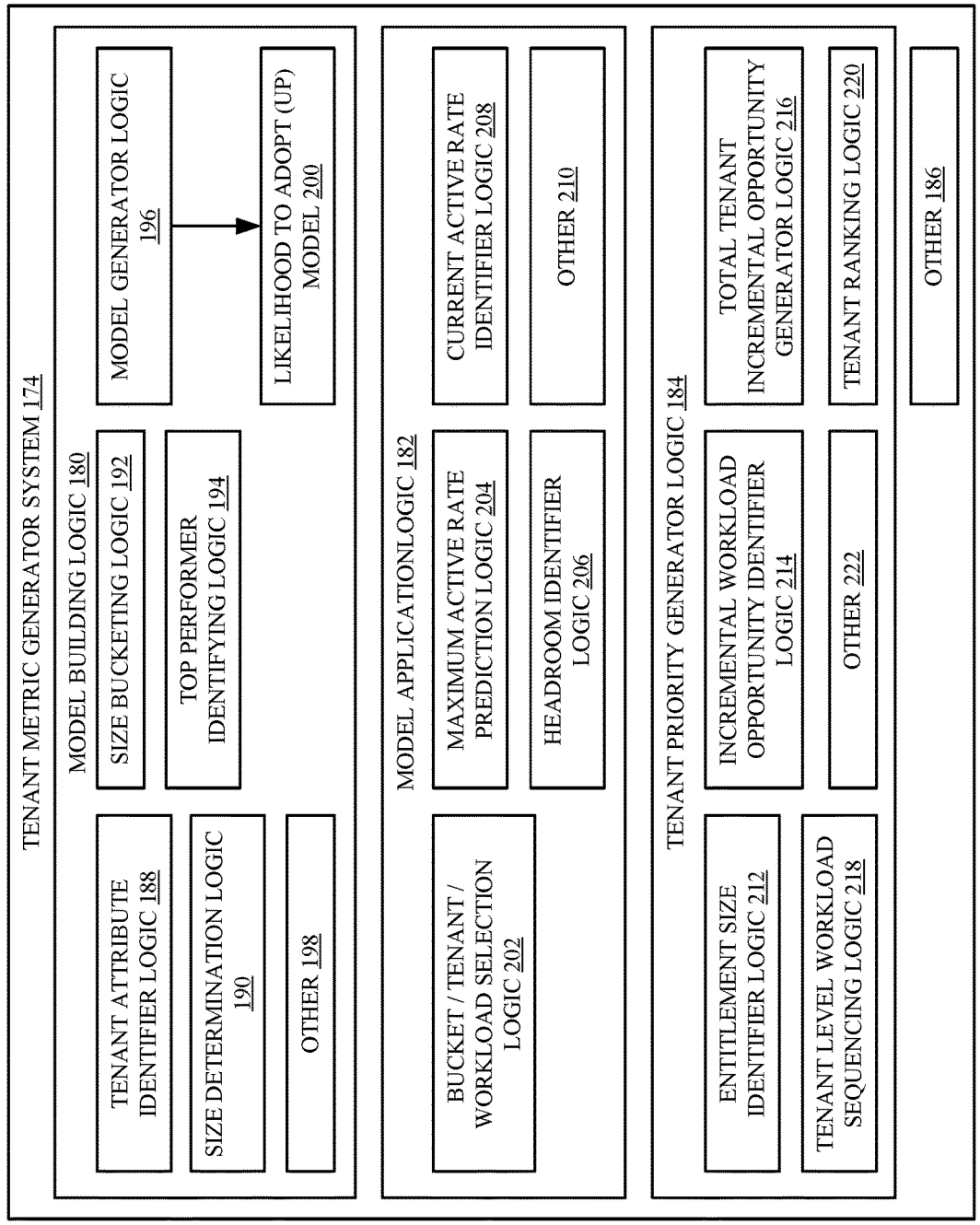
FIG. 2 is a block diagram showing one example of a tenant metric generator system, in more detail.

FIG. 2 is a block diagram showing one example of tenant metric generator system 174 in more detail. FIG. 2 shows that model building logic 180 illustratively includes tenant attribute identifier logic 188, size determination logic 190, size bucketing logic 192, top performer identifying logic 194, model generator logic 196, and it can include a wide variety of other items 198. FIG. 2 also shows that model generator logic 196 can output a likelihood to adopt (LTA) model 200.

FIG. 2 shows that, in one example, model application logic 182 can include bucket/tenant/workload selection logic 202, maximum active rate prediction logic 204, headroom identifier logic 206, current active rate identifier logic 208, and it can include a wide variety of other items 210. Tenant priority generator logic 184, in the example shown in FIG. 2, can include entitlement size identifier logic 212, incremental workload opportunity identifier logic 214, total tenant incremental opportunity generator logic 216, tenant level workload sequencing logic 218, tenant ranking logic 220, and it can include other items 222. Before describing the overall operation of architecture 100, and tenant metric generator system 174, in more detail, a brief description of some of the items in system 174, and their operation, will first be described.

Tenant attribute identifier logic 188 illustratively obtains or otherwise identifies various tenant attributes. These can include demographic or other attributes. Some examples include the size of the tenant, the deployment rate at which a particular workload is deployed, an active rate indicative of how many users are active on the deployed workload, etc. Some other attributes are discussed below with respect to FIG. 4.

Size determination logic 190 determines a potential size of the tenant and generates a corresponding size indicator. The size may be quantified in a variety of different ways, such as in the potential number of seats that may be used for the workload, or the size of the tenant in terms of employees in certain roles, etc. Size bucketing logic 192 illustratively divides all of the tenants for which attributes are being obtained, into size buckets. The size buckets may be predetermined size buckets, in which tenants that have a size indicator falling within a range corresponding to a bucket, are placed in that bucket. The size buckets may also be dynamically determined based on one or more statistics indicative of the various number of tenants that may fall into different buckets. Size bucketing logic 192 divides the tenants being considered into the different size buckets, based upon their size indicator.

Top performer identifying logic 194 illustratively identifies a set of top performing tenants in each size bucket. The top performing tenants may be identified based on any of a wide variety of different usage performance criteria. For instance, they may be identified as top performers based upon the proportionate share of users (indicated based on the size indicator) that have adopted and are meaningfully engaged with a particular workload or feature. They may be identified as top performers in a wide variety of other ways as well. In addition, the "top" performers may be defined as those having usage performance criteria in a particular percentile (such as the first decile) of the tenants in each size bucket, or they may be identified in a wide variety of other ways as well. The determination as to which tenant is a "top" performer may be determined based on whether the usage performance criteria exceed predefined thresholds, or the thresholds may be determined dynamically. All of these examples and others are contemplated herein.

Once the top performers are identified in each size bucket, then model generator logic 196 illustratively generates a model that models (or predicts) the usage performance of the top performers, based upon the attributes obtained or identified for each of those tenants. The model may be a regression model, or another model that is trained to predict the usage performance of the top performing tenants, based upon those attributes.

Model application logic 182 then applies that model to the remaining tenants in each bucket. Thus, bucket/tenant/workload selection logic 202 illustratively selects a size bucket, and selects a tenant to be analyzed, from that size bucket. The selected tenant is illustratively not one of the top performing tenants identified in that size bucket (as those tenants were the ones used to build and train the model). Instead, it is illustratively one of the remaining tenants in that size bucket. Logic 202 also illustratively selects a particular workload for which the analysis is to be performed. For instance, a given tenant may be analyzed based on a number of different workloads, or features. Thus, logic 202 selects one of those workloads for analysis, for this particular tenant.

Maximum active rate prediction logic 204 then illustratively predicts a maximum active rate for this tenant, for the given workload. For instance, assume that the tenant has purchased one hundred seat licenses for the workload. Based upon application of the model 200, the predicted maximum active percent for this client, for the selected workload, may be, for instance, 92%. That is, the model indicates that, given the attributes of the selected tenant, it is likely that 92% of the eligible users will adopt and engage with the workload being analyzed. Thus, the predicted maximum active rate for this tenant, for this workload, is 0.92.

Current active rate identifier logic 208 illustratively identifies the current active rate for this particular tenant, for the selected workload. For instance, of the one hundred licenses that have been purchased, it may be that thirty-two of those are actively being used. Thus, the current active rate, in such an example, is 0.32.

Headroom identifier logic 206 illustratively identifies the incremental rate for which the usage performance of this particular tenant can be improved, in the selected workload. In one example, this is done by subtracting the current active rate identifier identified by logic 208 from the maximum active rate predicted by logic 204. Continuing with the example discussed above, the headroom generated by headroom identifier logic 206 would thus be 0.92−0.32=0.60.

Once model application logic 182 has applied model 200 to a tenant, for each of its workloads, it illustratively selects a next tenant and performs the same analysis for the newly selected tenant, for the relevant workloads. This continues until each of the remaining tenants (those tenants other than the top performers) in the selected bucket have been analyzed. The process can then be repeated for each of the remaining tenants in another size bucket. Also, it will be noted that processing can be performed on tenants in different orders. For instance, the system need not necessarily process every tenant in a given size bucket before it moves on to processing other tenants. Similarly, it need not process all workloads for a particular tenant before it moves on to processing other tenants and their workloads. In addition, some of the processing can be performed in parallel so that multiple tenants are processed at the same time. All of these and other processing architectures are contemplated herein.

Tenant priority generator logic 184 then prioritizes the tenants based upon the metrics generated by applying the model to those tenants. In doing so, it identifies a raw incremental opportunity or incremental growth potential for each of the tenants. Thus, it takes the headroom and multiplies it by a number of eligible seats corresponding to the tenant to identify the likely number of seats that could be added for (e.g., that could adopt or increase usage of) a particular workload or feature. Thus, entitlement size identifier logic 212 identifies the total number of seats, for a particular workload, that a tenant is entitled to. This can be identified in variety of different ways. For instance, it may be identified by considering all licenses that are currently active, as well as a portion of those that are inactive. It may be identified in a wide variety of other ways as well. Incremental workload opportunity identifier logic 214 then combines the headroom generated by headroom identifier logic 206, for this tenant and this workload, with the entitlement size identified by logic 212. Logic 214 thus applies the headroom to the entitlement size identified by logic 212 to obtain a total number of incremental seats that are likely to be added (an incremental increase of usage performance, such as a number of seats that are likely to adopt a workload or feature or increase usage or engagement with the workload or feature), for this particular client, and this particular workload.

Total tenant incremental opportunity generator logic 216 illustratively combines the incremental workload opportunities identified by logic 214, for each client, across all workloads. This gives an overall workload opportunity identifier for this particular tenant.

Tenant level workload sequencing logic 218 illustratively breaks down the incremental opportunity identifier, per workload, for each tenant. It can output a sequence indicator identifying which workload should be concentrated on first, for this particular tenant, based upon the incremental opportunity identified for each workload, for a given tenant.

Tenant ranking logic 220 then illustratively generates a ranked list of tenants, based upon the various metrics identified. The ranked list of tenants can be ranked in a variety of different ways. For instance, the tenants may be ranked based on the total tenant incremental opportunity identifier generated by logic 216, or they can be ranked based on a particular incremental opportunity identifier for a particular workload. They can be ranked in a wide variety of other ways as well.

The total tenant incremental opportunity identifier generated by logic 216, the incremental workload opportunity identifier identified by logic 214, and the tenant level workload sequence identifier generated by logic 218 can all be output as metrics by system 174. It will be appreciated, though, that the headroom identifier generated by logic 206, the maximum active rate prediction identifier output by logic 204, or any of the other metrics or criteria or attributes identified, obtained or generated by system 174 can be output as well. This information is output to control signal generator 176, which uses it to generate control signals that can be provided to tenant service computing system 108 so that tenant service users 148-150 can perform desired services for the tenant (or so they can be performed automatically), based upon the control signals.

Figure 3:
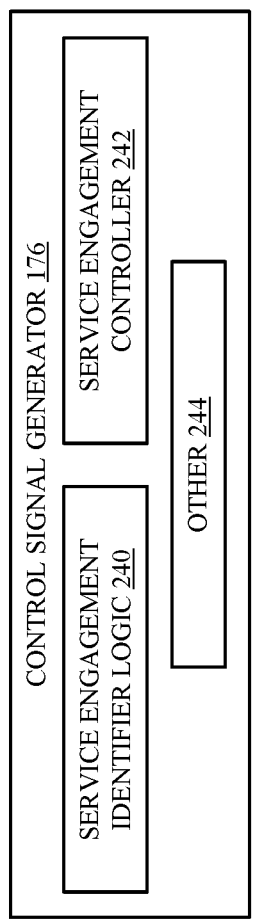
FIG. 3 is a block diagram showing one example of a control signal generator, in more detail.

FIG. 3 shows a block diagram of one example of control signal generator 176, in more detail. In the example shown in FIG. 3, control signal generator 176 illustratively includes service engagement identifier logic 240, service engagement controller 242, and it can include a wide variety of other items 244. Service engagement identifier logic 240 illustratively identifies the particular services that may be conducted for a particular tenant, based upon the inputs received from tenant metric generator system 174. For instance, given those signals, it may be that a certain feature adoption program should be run for a particular tenant. The service engagement identifier generated by logic 240 can be provided to service engagement controlled 242 which generates control signals to control portions of tenant service computing system 108 to provide those services. For instance, the control signals output by controller 242 may be interface control signals that control user interface logic 156 in order to surface the ranked list of tenants, the total incremental opportunity identifiers identified for each tenant, the incremental workload opportunity identifiers identified for each workload, and for each tenant, the tenant level workload sequencing identifiers generated by logic 218, or other items. The control signals may control tenant service functionality logic 154 to perform certain services, automatically, for the tenant, or to provide a notification to tenant service users 148-150 that such services should be provided, or have been provided. The control signals can be used to control a wide variety of other things as well.

Figure 4A:
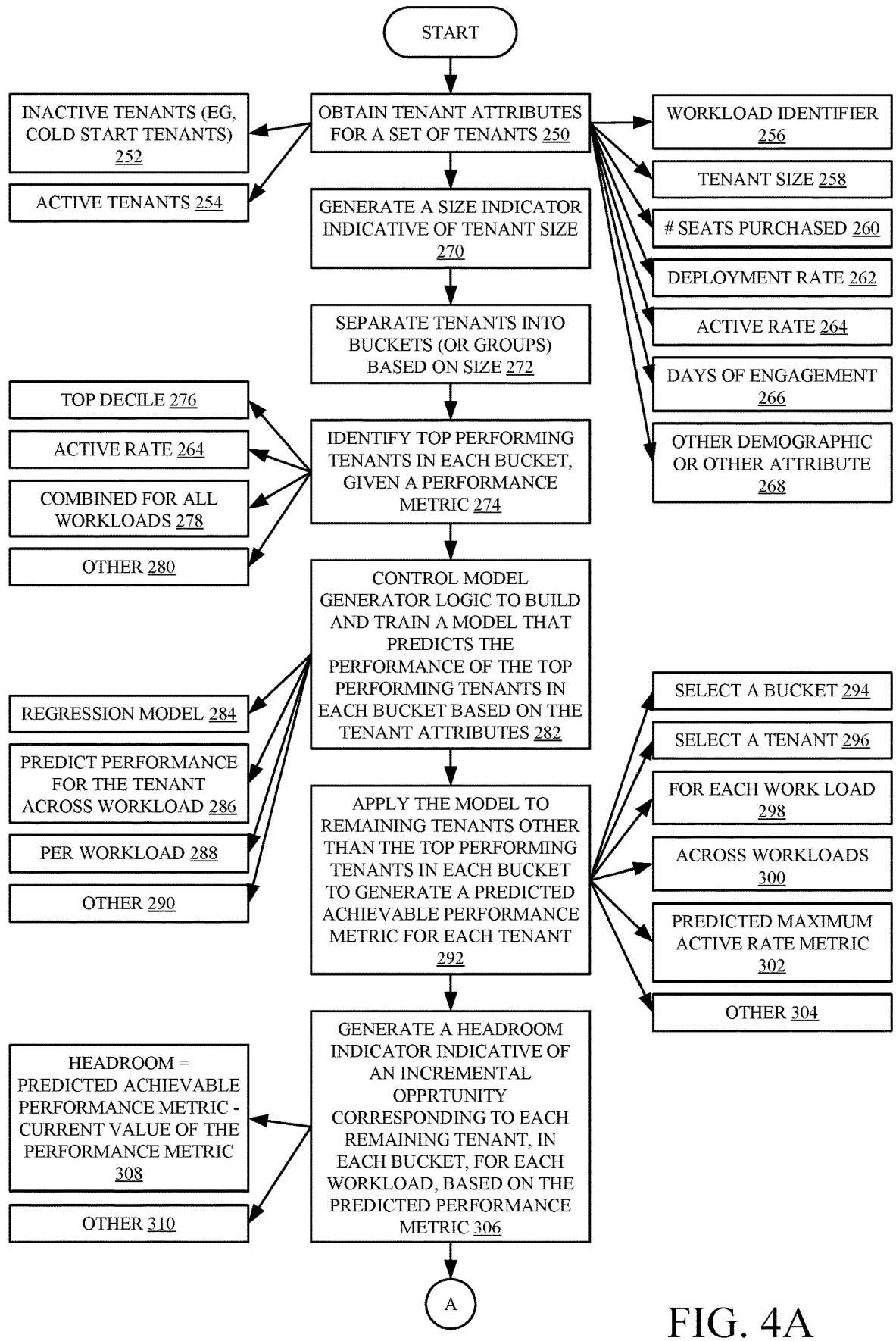
FIGS. 4A and 4B (collectively referred to herein as FIG. 4) show a flow diagram illustrating one example of the operation of the architecture shown in FIG. 1, in controlling services provided to a tenant.
Figure 4B:
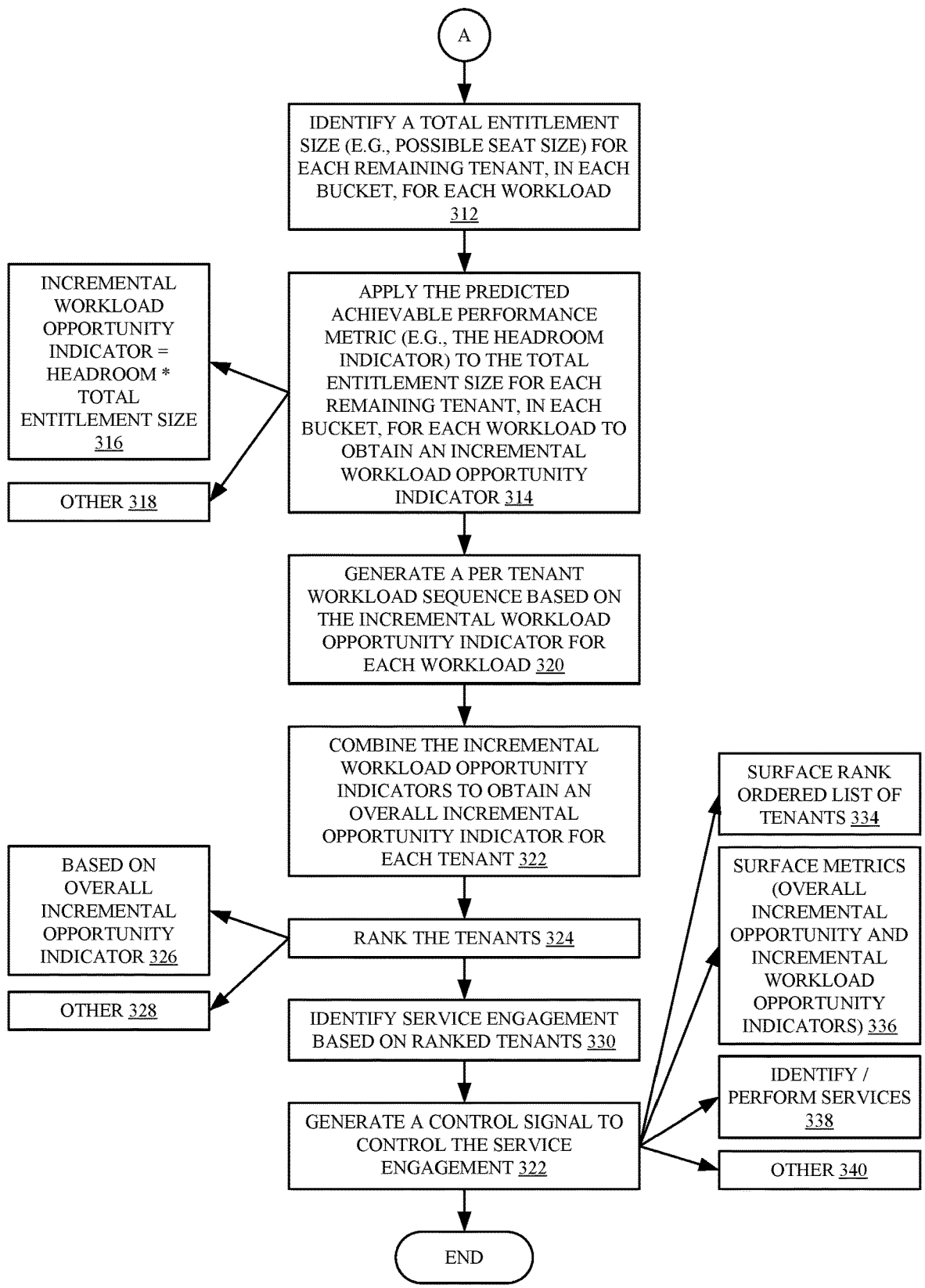

FIGS. 4A and 4B (collectively referred to herein as FIG. 4) show a flow diagram illustrating one example of the operation of architecture 100 in generating the various tenant metrics and control signals. FIGS. 1-4 will now be described in conjunction with one another.

Tenant attribute identifier 188 first obtains attributes for one or more tenants. This is indicated by block 250 in the flow diagram of FIG. 4. In one example, attribute generator logic 126, on each tenant computing system 102-104, collects and provides those attributes to tenant attribute identifier logic 188. The attributes can be from inactive tenants (which may also be referred to as cold start tenants) where attribute generator logic 126 may not exist or may not be providing many attributes. This is indicated by block 252. The attributes can be obtained from active clients, that are active on workloads that may be monitored and analyzed using computing system 106. In that case, the attributes may be provided by logic 126 on the tenant computing system, or in other ways. Receiving attributes from active tenants is indicated by block 254. The attributes can include a wide variety of different types of attributes. For instance, they can include a workload identifier 256 that identifies particular workloads being used by the tenant. They can include tenant size indicators 258 indicative of tenant size (such as seat size, license size, etc.). They can include a number of seats purchased attribute 260 that identifies a particular number of seats purchased for one or more different workloads. They can include a deployment rate indicator 262 indicative of how many of the purchased seats have been deployed. They can include an active rate indicator 264 indicative of the rate at which the deployed seats are active. They can include a days of engagement attribute 266 indicative of how many days a particular user in the tenant has been engaged with a workload or feature. They can include a wide variety of other demographic attributes, or other attributes as well, and this is indicated by block 268.

Based upon the attributes obtained, size determination logic 190 generates a size indicator indicative of a size of the tenant. This is indicated by block 270. The size can be measured in a variety of different ways, such as being based on the number of seats purchased attribute 260, the tenant size attribute 258 (which may be indicative of employee size, sales volume, etc.).

Size bucketing logic 192 then divides the tenants under analysis into buckets or groups based on their size. This is indicated by block 272.

Top performer identifying logic 194 then identifies the top performing tenants, in each bucket, based on a particular performance metric. This is indicated by block 274. The top performing tenants may be identified as a predefined portion of the tenants (such as the top decile) 276. It may be defined based on a wide variety of other criteria as well. The usage performance criteria can also vary widely and include the active rate indicator 264, the active rate combined for all workloads as indicated by block 278, or it can be a wide variety of other usage performance criteria as well, and this is indicated by block 280.

Logic 180 then controls model generator logic 196 to generate and train a model that predicts the usage performance criteria of the top performing tenants, in each bucket, based upon the tenant attributes. This is indicated by block 282. The model may be a regression model 284, and it may be trained to predict performance for each tenant, across all workloads as indicated by block 286, or on a per-workload basis, as indicated by block 288. The model can be built and trained in other ways as well, and this is indicated by block 290.

Model application logic 182 then applies the model to the remaining tenants (other than the top performing tenants) in each bucket to generate a predicted achievable performance metric for each tenant. This is indicated by block 292. In doing so, bucket/tenant/workload selection logic 202 selects a size bucket as indicated by block 294, a tenant as indicated by block 296 and a workload as indicated by block 298. It then applies the model to the selected tenant, for the selected workload, to generate a predicted achievable performance metric. It can apply the model, across all workloads, or it can apply the model on a per-workload basis. This is indicated by blocks 298 and 300.

In one example, the predicted achievable performance metric indicates a likely usage performance that may be achieved for this tenant. For instance, it may be a predicted maximum active rate metric indicative of a rate of adoption or usage of a particular product or feature within the tenant. The predicted maximum active rate metric is indicated by block 302. The predicted achievable performance metric can be any of a wide variety of other metrics or combinations of metrics as well, and this is indicated by block 304.

In one example, headroom identifier logic 206 identifies a headroom indicator indicative of an incremental opportunity corresponding to each of the remaining tenants in each bucket, for each workload, based upon the predicted achievable performance metric. This is indicated by block 306. In one example, logic 206 generates the headroom indicator by taking the predicted achievable performance metric and subtracting the current value of the same performance metric. For instance, again continuing with the example discussed above, assume that a tenant has paid for one hundred licenses. Assume that the predicted achievable performance metric corresponds to the predicted percent (or rate) of the available licenses that will be active, given the model. Assume that is 92% (or 0.92). Assume further that the current active rate identifier logic 208 has identified a currently active rate (the percent or rate of users of available licenses that are currently active), and that is 32% (or 0.32). Thus, the headroom (or the incremental opportunity available for this particular tenant and workload) is equal to 0.92−0.32=0.60. Generating the headroom indicator using logic 206, in this way, is indicated by block 308. The headroom indicator can be generated for each remaining tenant in each size bucket, and for each workload. An indicator of an incremental opportunity corresponding to each remaining tenant can be generated in other ways as well, and this is indicated by block 310.

Tenant priority generator logic 184 then generates a priority indicator for each of the remaining tenants in each size bucket. Entitlement size identifier logic 212 first identifies a total entitlement size (such as the total possible number of eligible seats) for each remaining tenant, in each bucket, for each workload. This is indicated by block 312. The total possible seat size may be identified in a variety of different ways. For instance, it may be the total number of licenses purchased for this workload, by this tenant. It may be determined in other ways as well.

Incremental workload opportunity identifier logic 214 then applies the headroom indicator to the total entitlement size for each remaining tenant, in each bucket, for each workload, in order to obtain an incremental workload opportunity indicator indicative of an incremental opportunity for each workload and each tenant. This is indicated by block 314. For instance, the incremental workload opportunity indicator for a particular workload and a particular tenant may be obtained by taking the headroom indicator and multiplying it by the total entitlement size for this workload, and this tenant. Assume, for example, that the total number of seats purchased by a particular tenant, for a given workload, is 1,000 seats. Assume that the headroom indicator is 0.60. Then, the incremental workload opportunity indicator would be 0.60×1000=600. This gives an indication as to the number of seats which this particular tenant will likely add, given its headroom for this workload and given the total seats that the tenant is entitled to, for this workload. Obtaining the incremental workload opportunity indicator in this way is indicated by block 316. It can be obtained in other ways as well, and this indicated by block 318.

Tenant level workload sequencing logic 218 then generates a per-tenant workload sequence based on the incremental workload opportunity indicated for each workload. This is indicated by block 320. By way of example assume that the incremental workload opportunity indicator for a first workload for a given tenant is 600. This indicates that the incremental number of seats that may adopt or increase usage of a feature or product is 600, for this tenant and this workload. Assume that the same indicator for the same tenant but a second workload is 1,200. This would mean that the incremental opportunity for adding seats for the second workload is 1,200. Thus, tenant level workload sequencing logic 218 generates a sequence indicating that the incremental opportunity for the first workload for this tenant is less than that for the second workload. This may provide the tenant service users 148-150 additional information in deciding how to approach various tenants. It may also cause control signal generator 176 to generate different control signals so that different tenant service functionality is performed by logic 154, for the tenants.

Total tenant incremental opportunity generator logic 216 then combines the incremental workload opportunity indicators to obtain an overall incremental opportunity indicator for each tenant. For instance, if a particular tenant is being analyzed with respect to five different workloads. Then the incremental workload opportunity indicator for each of those five workloads, for that tenant, may be combined to obtain an overall incremental opportunity for the tenant. By way of example, assume that the incremental opportunity for each of the five workloads is 600, 1,000, 400, 800 and 200, respectively. Then those incremental workload opportunity indicators may be combined (such as by adding them) to obtain a total incremental opportunity indicator of 3,000, which indicates the total number of seats, for this tenant, that may adopt or increase usage of a workload or feature. Combining the incremental workload opportunity indicators to obtain an overall incremental opportunity indicator for each tenant is indicated by block 322 in the flow diagram of FIG. 4.

Tenant ranking logic 220 then illustratively generates a ranked list of tenants, based upon one or more of the incremental opportunity indicators. This is indicated by block 324. For instance, it can be based on the overall incremental opportunity indicator as indicated by block 326, or it can be based on other information as indicated by block 328.

Control signal generator 176 receives the various information generated by tenant metric generator system 174. Based on these signals, service engagement identifier logic 240 identifies tenant services that may be used to better engage tenants, based upon the ranked list. This is indicated by block 330. By way of example, it may be that some tenant services that are used to automatically upgrade tenants, or that are used to offer upgrades to tenants, or that are used to train or otherwise perform services for a tenant, may be identified by service engagement identifier logic 240. These are only examples.

Service engagement controller 242 then generates one or more control signals to control the service engagement identified by service engagement identifier logic 240. This is indicated by block 332. By way of example, the control signals may be provided to user interface logic 156 to surface the rank ordered list of tenants. This is indicated by block 334. They may be provided to user interface logic 156 to surface the various metrics generated by system 174 either in addition to, or instead of, the rank ordered list. The metrics may include, for instance, the overall incremental opportunity and the incremental workload opportunity indicators. This is indicated by block 336. They may include the maximum active rate indicator predicted by logic 204. They may include a wide variety of other metrics as well.

In response to receiving the control signals, tenant service computing system 108 can automatically identify and perform the services, based upon the control signals. This is indicated by block 338. The control signals can be generated to control the service engagement in a wide variety of other ways as well, and this is indicated by block 340.

It can thus be seen that the present discussion provides a description that significantly enhances a computing system architecture. It automatically obtains tenant attributes and builds and trains a model based upon the highest performing tenants. The model is then applied to the remaining tenants to generate metrics indicative of likely adoption and usage of workloads or features. The metrics can be used to automatically generate control signals to control another computing system (controllable elements) based on the metrics.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
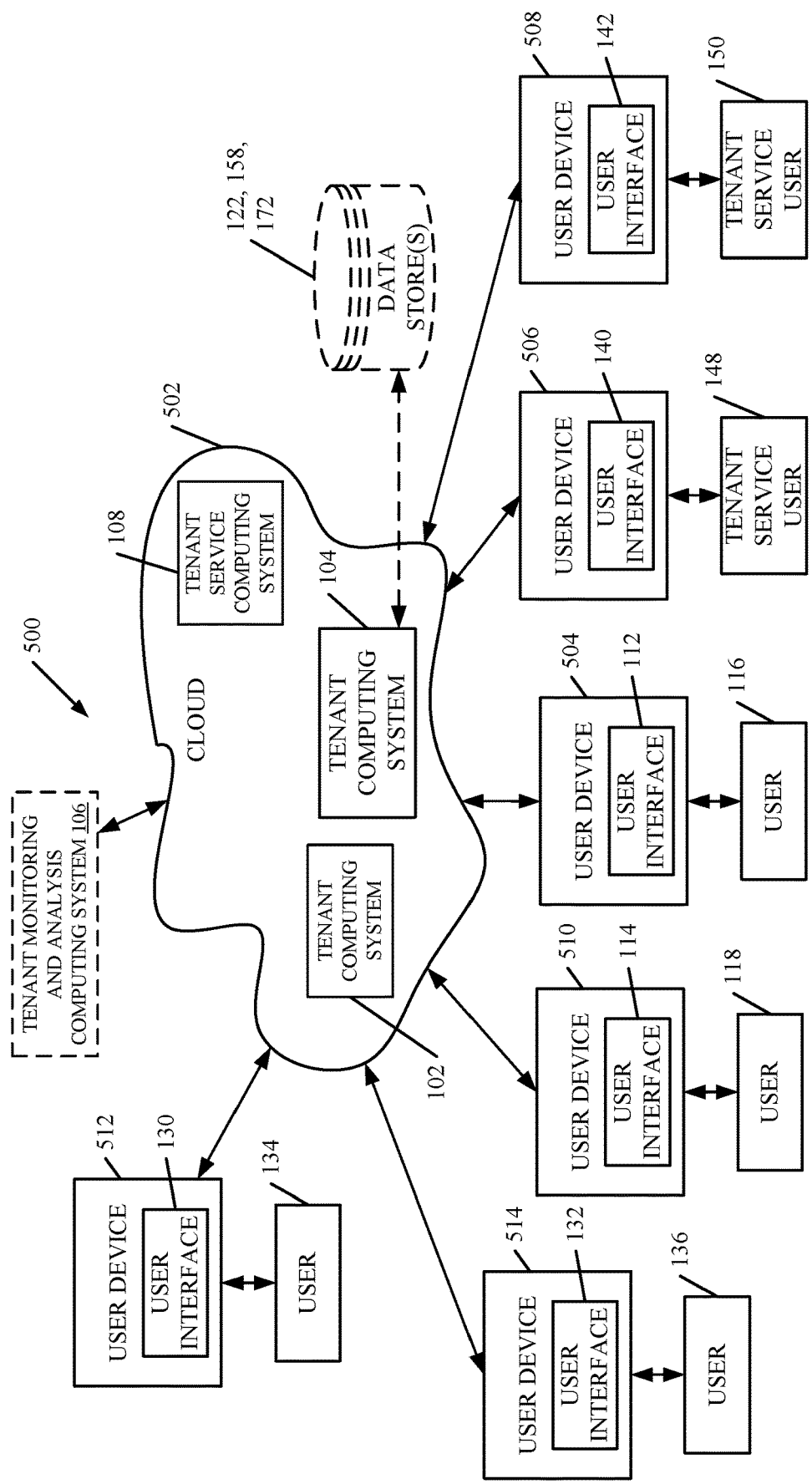
FIG. 5 is a block diagram showing one example of the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that computing system 102 can be located in cloud 502 (which can be public, private, or a combination where portions are public while others are private). Therefore, users 116, 118, 134, 136, 148, 150 use user devices 504, 506, 508, 510, 512 and 514 to access those systems through cloud 502.

FIG. 5 also depicts another example of a cloud architecture. FIG. 5 shows that it is also contemplated that some elements of architecture 100 can be disposed in cloud 502 while others are not. By way of example, data stores 122, 158 and 172 can be disposed outside of cloud 502, and accessed through cloud 502. In another example, computing system 106 (or other items) can be outside of cloud 502. Regardless of where they are located, they can be accessed directly by device 504-514, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
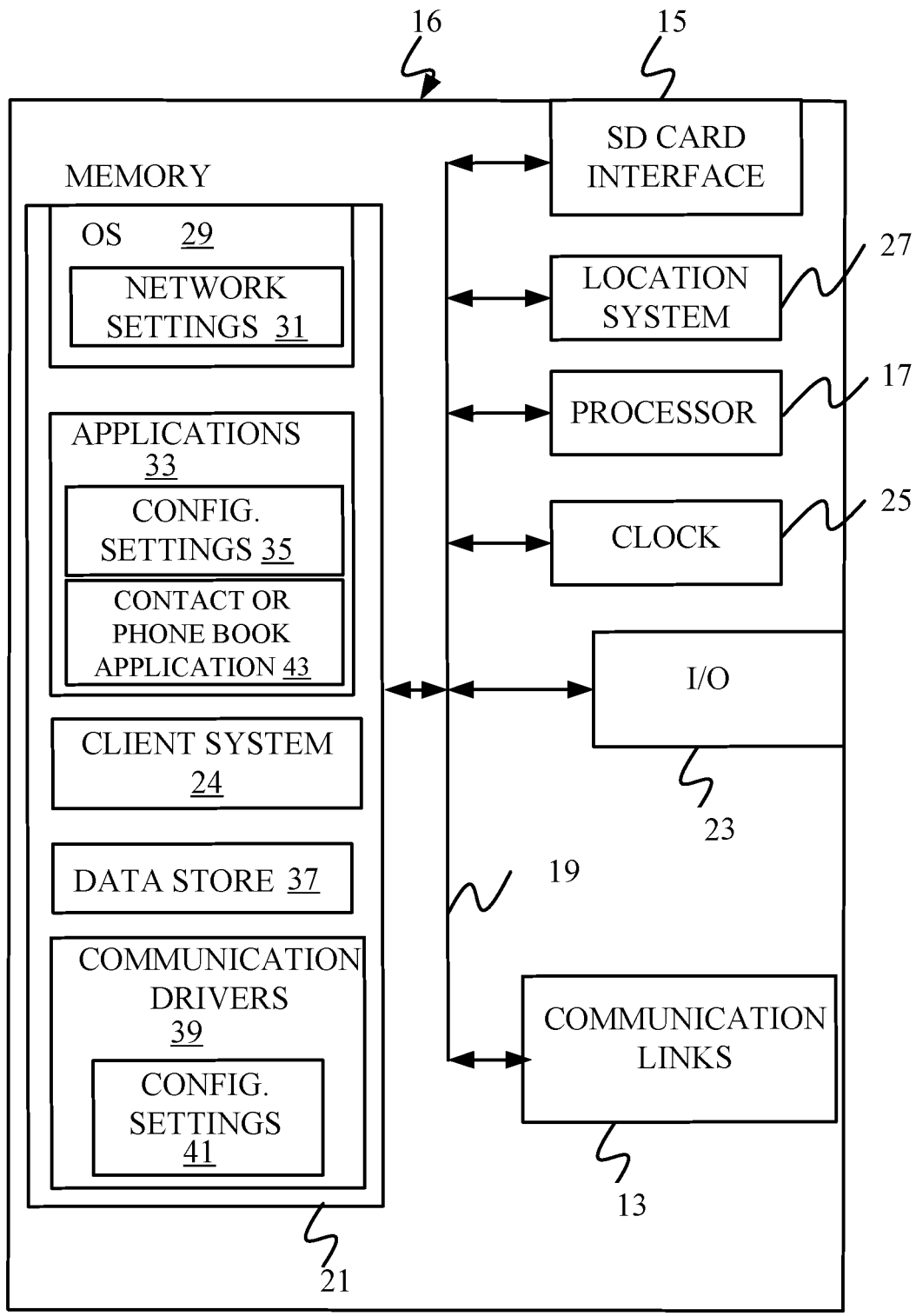
FIGS. 6-8 show examples of mobile devices that can be used in the architectures shown in the previous figures.
Figure 7:
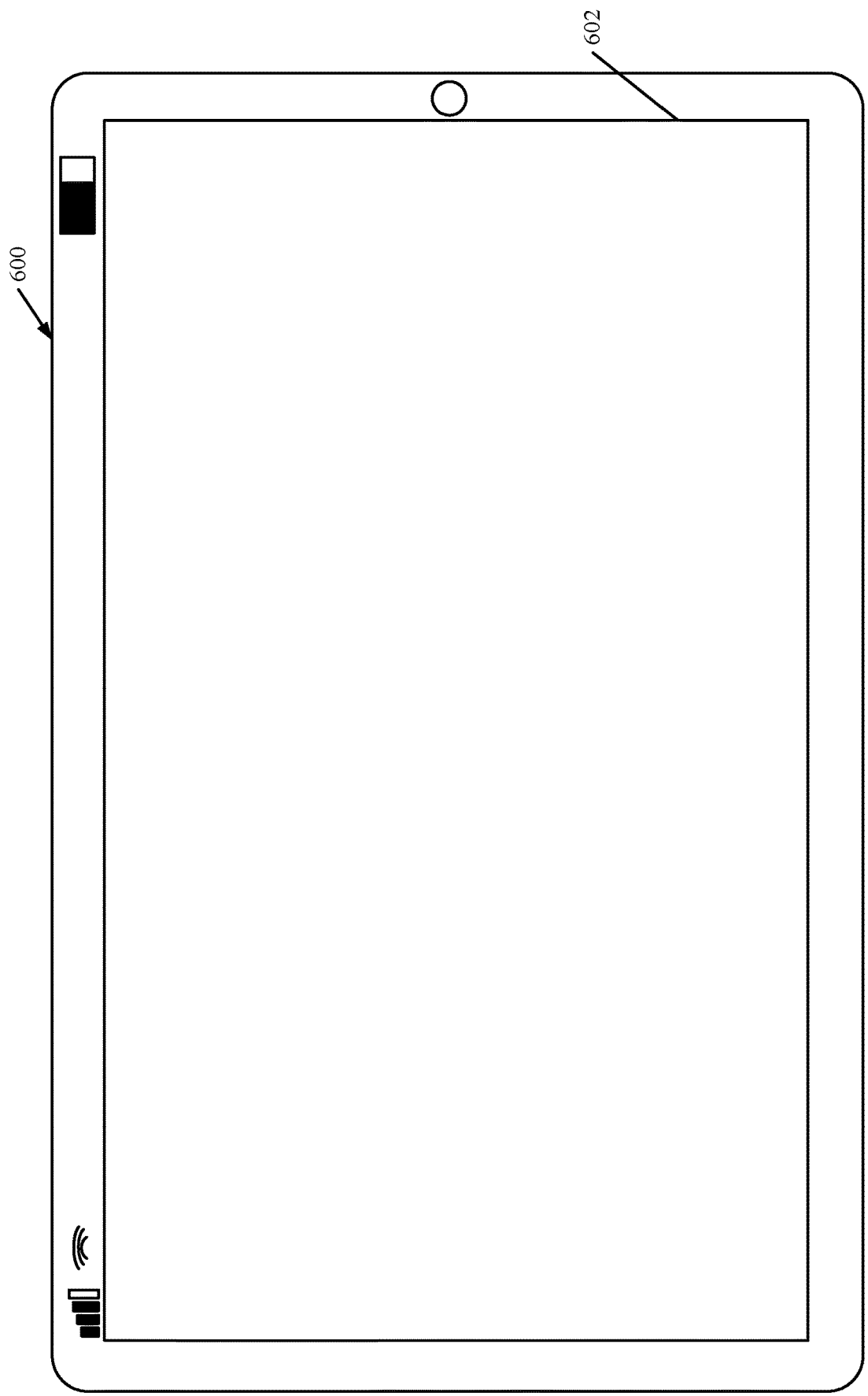
Figure 8:
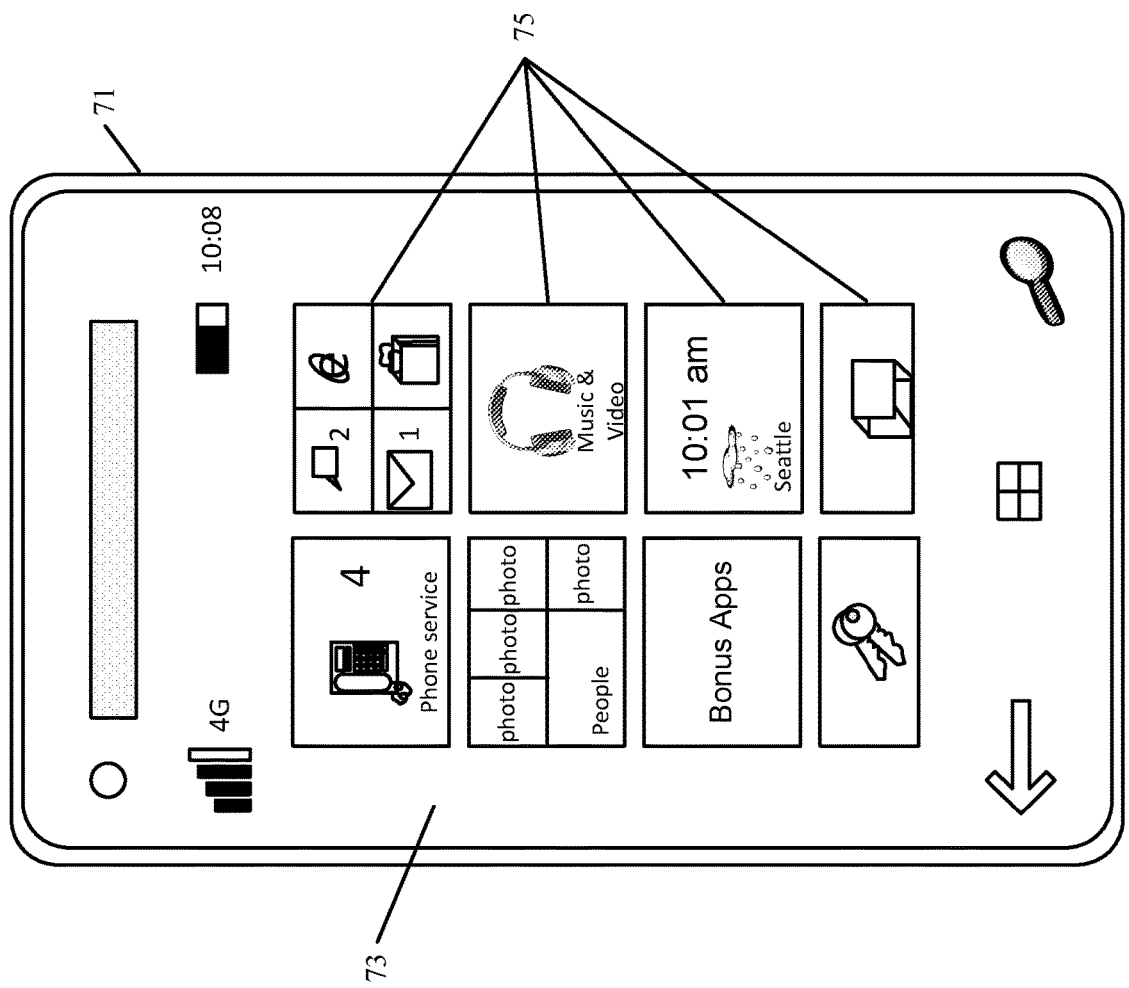

FIG. 6 is a simplified block diagram of one illustrative example of a handheld or mobile computing device that can be used as a user's or client's hand held device 16, in which the present system (or parts of it) can be deployed. FIGS. 7-8 are examples of handheld or mobile devices.

FIG. 6 provides a general block diagram of the components of a client device 16 that can run components of architecture 100 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1×rtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one example in which device 16 is a tablet computer 600. In FIG. 7, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
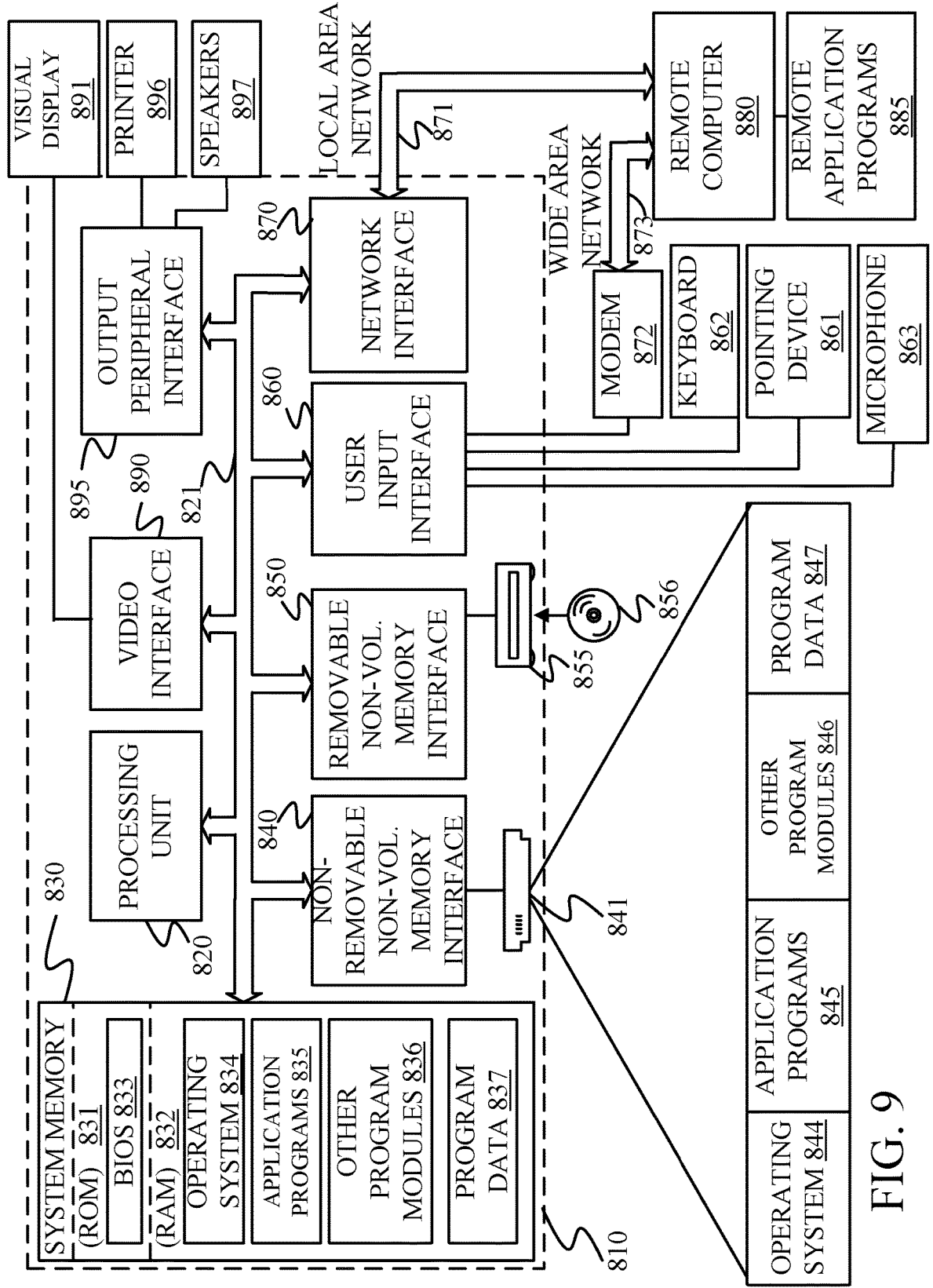
FIG. 9 is a block diagram showing one example of a computing environment that can be used in the architectures shown in the previous figures.

FIG. 9 is one example of a computing environment in which architecture 100, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

model building logic that receives a plurality of sets of tenant attributes, each set being indicative of attributes corresponding to a tenant computing system, and trains a model to predict usage performance relative to a workload, indicated by a usage performance indicator, of a first subset of the plurality of tenants, based on the sets of attributes corresponding to the first subset of the plurality of tenants;

model application logic that applies the model to a second subset of the plurality of tenants, different from the first subset of tenants, to obtain an incremental usage performance indicator corresponding to each tenant in the second subset of tenants, the usage performance indicator being indicative of a likely incremental increase in usage of the workload for the corresponding tenant in the second subset of tenants; and a control signal generator that generates a control signal to control a controllable logic element based on at least one of the incremental usage performance indicators.

Example 2 is the computing system of any or all previous examples and further comprising:

tenant priority generator logic configured to generate a ranked list of tenants, ranking the tenants in the second subset of tenants based at least in part on the incremental usage performance indicator corresponding to each of the tenants in the second subset of tenants.

Example 3 is the computing system of any or all previous examples wherein the tenant priority generator logic comprises:

entitlement size identifier logic configured to identify an entitlement size indicator, indicative of a number of users that are entitled to use the workload, for each tenant in the second subset of tenants; and an incremental workload opportunity identifier configured to, for each tenant in the second subset of tenants, identify an incremental workload opportunity indicator indicative of a size of increase of usage of the workload likely achievable for the tenant, based on the entitlement size indicator for the tenant and the usage performance indicator corresponding to the tenant.

Example 4 is the computing system of any or all previous examples wherein the model application logic is configured to generate a usage performance indicator for each tenant in the second subset of tenants for each of a plurality of different workloads.

Example 5 is the computing system of any or all previous examples wherein the entitlement size identifier logic is configured to identify an entitlement size indicator for each of the tenants in the second subset of tenants, for each of a plurality of different workloads.

Example 6 is the computing system of any or all previous examples wherein the incremental workload opportunity identifier is configured to, for each tenant in the second subset of tenants, identify an incremental workload opportunity indicator indicative of a size of increase of usage of each of the plurality of workloads likely achievable for the tenant, based on the entitlement size indicators for the tenant and the usage performance indicators corresponding to the tenant and each of the workloads.

Example 7 is the computing system of any or all previous examples wherein the tenant priority generator logic comprises:

total tenant incremental opportunity generator logic configured to generate a total tenant incremental opportunity indicator, for each tenant in the second subset of tenants, indicative of a combination of the incremental workload opportunity indicators for the plurality of different workloads for each tenant.

Example 8 is the computing system of any or all previous examples wherein the tenant priority generator logic comprises:

tenant level workload sequencing logic configured to generate a workload sequencing indicator, for each tenant in the second subset of tenants, based on the incremental workload opportunity indicators for the tenant.

Example 9 is the computing system of any or all previous examples wherein the model application logic comprises:

maximum active rate prediction logic configured to apply the model to the tenants in the second subset of tenants to obtain, as the incremental usage performance indicator, a likely maximum usage rate indicator indicative of a likely maximum rate of usage of the workload.

Example 10 is the computing system of any or all previous examples wherein the model application logic comprises:

headroom identifier logic that identifies a headroom indicator indicative of a difference between the likely maximum rate indicator and a current rate indicator indicative of a current usage rate indicator indicative of a current rate of usage of the workload, for the tenant, wherein the incremental workload opportunity identifier is configured to apply the headroom indicator to the entitlement size indicator to obtain the incremental workload opportunity indicator for the workload.

Example 11 is the computing system of any or all previous examples wherein the model building logic is configured to train the model based on the attributes from the first subset of tenants that meet a performance threshold relative to the workload, and wherein the second subset of tenants do not meet the performance threshold relative to the workload.

Example 12 is the computing system of any or all previous examples wherein the controllable logic element comprises:

user interface logic configured to surface the incremental usage performance indicators.

Example 13 is the computing system of any or all previous examples wherein the plurality of different tenants have different sizes indicated by a size indicator and wherein the model building logic divides the tenants into a plurality of different size groups and trains a separate model, corresponding to each size group, based on the attributes for a first subset of the tenants in each size group, the model application logic being configured to apply the model, corresponding to each size group, to a second subset of the tenants in that size group.

Example 14 is a computer implemented method, comprising:

receiving a plurality of sets of tenant attributes, each set being indicative of attributes corresponding to a tenant computing system;

training a model to predict usage performance relative to a workload, indicated by a usage performance indicator, of a first subset of the plurality of tenants, based on the sets of attributes corresponding to the first subset of the plurality of tenants;

applying the model to a second subset of the plurality of tenants, different from the first subset of tenants, to obtain an incremental usage performance indicator corresponding to each tenant in the second subset of tenants, the usage performance indicator being indicative of a likely incremental increase in usage of the workload for the corresponding tenant in the second subset of tenants; and generating a control signal to control a controllable logic element based on at least one of the incremental usage performance indicators.

Example 15 is the computer implemented method of any or all previous examples and further comprising:

generating a ranked list of tenants, ranking the tenants in the second subset of tenants based at least in part on the incremental usage performance indicator corresponding to each of the tenants in the second subset of tenants.

Example 16 is the computer implemented method of any or all previous examples wherein training a model comprises:

training the model based on the attributes from the first subset of tenants that meet a performance threshold relative to the workload, and wherein applying the model comprises applying the model to the second subset of tenants do not meet the performance threshold relative to the workload.

Example 17 is the computer implemented method of any or all previous examples wherein generating a control signal comprises:

generating the control signal to control user interface logic to surface the incremental usage performance indicators.

Example 18 is the computer implemented method of any or all previous examples wherein the plurality of different tenants have different sizes indicated by a size indicator and wherein training the model comprises:

dividing the tenants into a plurality of different size groups; and training a separate model, corresponding to each size group, based on the attributes for a first subset of the tenants in each size group, and wherein applying the model comprises applying the model, corresponding to each size group, to a second subset of the tenants in that size group.

Example 19 is a computing system, comprising:

model building logic that receives a plurality of sets of tenant attributes, each set being indicative of attributes corresponding to a tenant computing system, and trains a model to predict usage performance relative to a workload, indicated by a usage performance indicator, of a first subset of the plurality of tenants, based on the sets of attributes corresponding to the first subset of the plurality of tenants;

model application logic that applies the model to a second subset of the plurality of tenants, different from the first subset of tenants, to obtain an incremental usage performance indicator corresponding to each tenant in the second subset of tenants, the usage performance indicator being indicative of a likely incremental increase in usage of the workload for the corresponding tenant in the second subset of tenants;

tenant priority generator logic configured to generate a ranked list of tenants, ranking the tenants in the second subset of tenants based at least in part on the incremental usage performance indicator corresponding to each of the tenants in the second subset of tenants; and a control signal generator that generates a control signal to control a controllable logic element based on at least one of the incremental usage performance indicators and the ranked list of tenants.

Example 20 is the computing system of any or all previous examples wherein the tenant priority generator logic comprises:

entitlement size identifier logic configured to identify an entitlement size indicator, indicative of a number of users that are entitled to use the workload, for each tenant in the second subset of tenants; and an incremental workload opportunity identifier configured to, for each tenant in the second subset of tenants, identify an incremental workload opportunity indicator indicative of a size of increase of usage of the workload likely achievable for the tenant, based on the entitlement size indicator for the tenant and the usage performance indicator corresponding to the tenant.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
   at least one processor; and
   memory storing instructions executable by the at least one processor, wherein the instructions, when executed, cause the computing system to:
      receive a plurality of sets of tenant attributes, each set being indicative of attributes corresponding to a tenant of a plurality of tenants, each tenant comprising a tenant computing system that hosts a workload for users associated with the tenant;
      select a first subset of the plurality of tenants based on usage performance criteria of the first subset of tenants relative to the workload;
      train a model to predict usage performance relative to the workload, indicated by a usage performance indicator, of the first subset of tenants, based on the sets of attributes corresponding to the first subset of tenants;
      apply the model to a second subset of the plurality of tenants, different from the first subset of tenants, to obtain an incremental usage performance indicator corresponding to each tenant in the second subset of tenants, the incremental usage performance indicator being indicative of a likely incremental increase in usage of the workload for the corresponding tenant in the second subset of tenants; and
      generate a control signal to control a controllable logic element based on at least one of the incremental usage performance indicators.

2. The computing system of claim 1 wherein the instructions cause the computing system t:
   generate a ranked list of tenants, ranking the tenants in the second subset of tenants based at least in part on the incremental usage performance indicator corresponding to each of the tenants in the second subset of tenants.

3. The computing system of claim 2 wherein the instructions cause the computing system to:
   identify an entitlement size indicator, indicative of a number of users that are entitled to use the workload, for each tenant in the second subset of tenants; and
   for each tenant in the second subset of tenants, identify an incremental workload opportunity indicator indicative of a size of increase of usage of the workload likely achievable for the tenant, based on the entitlement size indicator for the tenant and the usage performance indicator corresponding to the tenant.

4. The computing system of claim 3 wherein the instructions cause the computing system to generate a usage performance indicator for each tenant in the second subset of tenants for each of a plurality of different workloads.

5. The computing system of claim 4 wherein the instructions cause the computing system to identify an entitlement size indicator for each of the tenants in the second subset of tenants, for each of a plurality of different workloads.

6. The computing system of claim 5 wherein the instructions cause the computing system to, for each tenant in the second subset of tenants, identify an incremental workload opportunity indicator indicative of a size of increase of usage of each of the plurality of workloads likely achievable for the tenant, based on the entitlement size indicators for the tenant and the usage performance indicators corresponding to the tenant and each of the workloads.

7. The computing system of claim 6 wherein the instructions cause the computing system to:
   generate a total tenant incremental opportunity indicator, for each tenant in the second subset of tenants, indicative of a combination of the incremental workload opportunity indicators for the plurality of different workloads for each tenant.

8. The computing system of claim 7 wherein the instructions cause the computing system to:
   generate a workload sequencing indicator, for each tenant in the second subset of tenants, based on the incremental workload opportunity indicators for the tenant.

9. The computing system of claim 8 wherein the instructions cause the computing system to:
   apply the model to the tenants in the second subset of tenants to obtain, as the incremental usage performance indicator, a likely maximum usage rate indicator indicative of a likely maximum rate of usage of the workload.

10. The computing system of claim 9 wherein the instructions cause the computing system to:
    identify a headroom indicator indicative of a difference between the likely maximum rate indicator and a current rate indicator indicative of a current usage rate indicator indicative of a current rate of usage of the workload, for the tenant; and
    apply the headroom indicator to the entitlement size indicator to obtain the incremental workload opportunity indicator for the workload.

11. The computing system of claim 1 wherein the instructions cause the computing system to train the model based on the attributes from the first subset of tenants that meet a performance threshold relative to the workload, and wherein the second subset of tenants do not meet the performance threshold relative to the workload.

12. The computing system of claim 1 wherein the instructions cause the computing system to:
   surface the incremental usage performance indicators.

13. The computing system of claim 1 wherein the plurality of different tenants have different sizes indicated by a size indicator, and wherein the instructions cause the computing system to:
   divide the tenants into a plurality of different size groups;
   train a separate model, corresponding to each size group, based on the attributes for a first subset of the tenants in each size group; and
   apply the model, corresponding to each size group, to a second subset of the tenants in that size group.

14. A computer implemented method, comprising:
   receiving a plurality of sets of tenant attributes, each set being indicative of attributes corresponding to a tenant of a plurality of tenants, each tenant comprising a tenant computing system that hosts a workload for users associated with the tenant;
   selecting a first subset of the plurality of tenants based on usage performance criteria of the first subset of tenants relative to the workload;
   training a model to predict usage performance relative to the workload, indicated by a usage performance indicator, of the first subset of the plurality of tenants, based on the sets of attributes corresponding to the first subset of the plurality of tenants;
   applying the model to a second subset of the plurality of tenants, different from the first subset of tenants, to obtain an incremental usage performance indicator corresponding to each tenant in the second subset of tenants, the incremental usage performance indicator being indicative of a likely incremental increase in usage of the workload for the corresponding tenant in the second subset of tenants; and
   generating a control signal to control a controllable logic element based on at least one of the incremental usage performance indicators.

15. The computer implemented method of claim 14 and further comprising:
   generating a ranked list of tenants, ranking the tenants in the second subset of tenants based at least in part on the incremental usage performance indicator corresponding to each of the tenants in the second subset of tenants.

16. The computer implemented method of claim 15 wherein training a model comprises:
   training the model based on the attributes from the first subset of tenants that meet a performance threshold relative to the workload, and wherein applying the model comprises applying the model to the second subset of tenants do not meet the performance threshold relative to the workload.

17. The computer implemented method of claim 14 wherein generating a control signal comprises:
   generating the control signal to control user interface logic to surface the incremental usage performance indicators.

18. The computer implemented method of claim 14 wherein the plurality of different tenants have different sizes indicated by a size indicator and wherein training the model comprises:
   dividing the tenants into a plurality of different size groups; and
   training a separate model, corresponding to each size group, based on the attributes for a first subset of the tenants in each size group, and wherein applying the model comprises applying the model, corresponding to each size group, to a second subset of the tenants in that size group.

19. A computing system, comprising:
   at least one processor; and
   memory storing instructions executable by the at least one processor, wherein the instructions, when executed, configure the computing system to:
      receive a plurality of sets of tenant attributes, each set being indicative of attributes corresponding to a tenant of a plurality of tenants, wherein
         each tenant comprises a tenant computing system that hosts a workload for users associated with the tenant, and
         the plurality of different tenants have different sizes indicated by a size indicator;
      divide the tenants into a plurality of different size groups;
      train a separate model, corresponding to each size group based on the attributes for a first subset of the tenants in each size group, to predict usage performance relative to a workload, indicated by a usage performance indicator, of the first subset of the plurality of tenants;
      apply the model to a second subset of the plurality of tenants, different from the first subset of tenants, to obtain an incremental usage performance indicator corresponding to each tenant in the second subset of tenants, the usage performance indicator being indicative of a likely incremental increase in usage of the workload for the corresponding tenant in the second subset of tenants;
      generate a ranked list of tenants, ranking the tenants in the second subset of tenants based at least in part on the incremental usage performance indicator corresponding to each of the tenants in the second subset of tenants; and
      generate a control signal to control a controllable logic element based on at least one of the incremental usage performance indicators and the ranked list of tenants.

20. The computing system of claim 19 wherein the instructions, when executed, configure the computing system to:
   identify an entitlement size indicator, indicative of a number of users that are entitled to use the workload, for each tenant in the second subset of tenants; and
   for each tenant in the second subset of tenants, identify an incremental workload opportunity indicator indicative of a size of increase of usage of the workload likely achievable for the tenant, based on the entitlement size indicator for the tenant and the usage performance indicator corresponding to the tenant.

* * * * *